(12) United States Patent
Fu et al.

(10) Patent No.: US 8,605,093 B2
(45) Date of Patent: Dec. 10, 2013

(54) PIPE RECONSTRUCTION FROM UNORGANIZED POINT CLOUD DATA

(75) Inventors: Yan Fu, Shangai (CN); Xiaofeng Zhu, Shanghai (CN); Jin Yang, Shanghai (CN); Zhenggang Yuan, Beijing (CN)

(73) Assignee: Autodesk, Inc., San Rafael, CA (US)

( * ) Notice: Subject to any disclaimer, the term of this patent is extended or adjusted under 35 U.S.C. 154(b) by 285 days.

(21) Appl. No.: 12/849,647

(22) Filed: Aug. 3, 2010

(65) Prior Publication Data

US 2011/0304628 A1 Dec. 15, 2011

Related U.S. Application Data

(60) Provisional application No. 61/353,486, filed on Jun. 10, 2010.

(51) Int. Cl.
*G06T 11/20* (2006.01)

(52) U.S. Cl.
USPC ........................................................ 345/440

(58) Field of Classification Search
USPC ........................................................ 345/440
See application file for complete search history.

(56) References Cited

U.S. PATENT DOCUMENTS

| | | | |
|---|---|---|---|
| 3,069,654 | A | 12/1962 | Hough |
| 5,988,862 | A * | 11/1999 | Kacyra et al. ..................... 703/6 |
| 6,256,038 | B1 | 7/2001 | Krishnamurthy |
| 7,995,055 | B1 | 8/2011 | Ma et al. |
| 2002/0149585 | A1 | 10/2002 | Kacyra et al. |
| 2002/0158870 | A1* | 10/2002 | Brunkhart et al. ............ 345/424 |
| 2003/0001835 | A1* | 1/2003 | Dimsdale et al. ............. 345/419 |
| 2005/0286767 | A1* | 12/2005 | Hager et al. .................. 382/190 |
| 2006/0112042 | A1 | 5/2006 | Platt et al. |
| 2008/0075326 | A1 | 3/2008 | Otani et al. |
| 2010/0164951 | A1 | 7/2010 | Stewart |
| 2010/0302247 | A1* | 12/2010 | Perez et al. ................... 345/440 |
| 2011/0184695 | A1 | 7/2011 | Grzesiak |
| 2011/0304628 | A1 | 12/2011 | Fu et al. |

FOREIGN PATENT DOCUMENTS

WO 2011085437 7/2011

OTHER PUBLICATIONS

Ruwen Schnabel Efficient Point-Cloud Processing with Primitive Shapes 2009, Dissertation University of Bonn (Germany), pp. 6-53.*
Soon-Wook Kwon, Katharine A. Liapi, Carl T. Haas, Frederic Bosché, Algorithms for fitting Cylindrical Objects to sparse range point clouds for rapid workspace modeling, 2003, Proceedings of the 20th International Symposium on Automation and Robotics in Construction (ISARC), Eindhoven, the Netherlands, p. 173-178.*
Mohamed El-Mehalawi, R. Allen Miller, A Database System of Mechanical Components Based on Geometric and Topological Similarity. Part I: Representation, 2003, Computer-Aided Design 35:83-94.*

(Continued)

*Primary Examiner* — Aaron M Richer
*Assistant Examiner* — Michael J Cobb
(74) *Attorney, Agent, or Firm* — Gates & Cooper LLP

(57) ABSTRACT

A method, system, apparatus, article of manufacture, and computer readable storage medium provide the ability to reconstruct a pipe from point cloud data. Point cloud data is obtained. Primitive geometric shapes are detected in the point cloud data. A pipeline is determined by determining predecessor and successor primitive geometric shapes for each of the shapes. Diameters, coplanarity, and angles between the shapes are corrected. The shapes are connected and output.

24 Claims, 9 Drawing Sheets

(56) References Cited

OTHER PUBLICATIONS

Mohamed El-Mehalawi, R. Allen Miller, A Database System of Mechanical Components Based on Geometric and Topological Similarity. Part II: Indexing, Retrieval, Matching and Similarity Assessment, 2003, Computer-Aided Design 35:95-105.*

Kuiyang Lou, Subramaniam Jayanti, Natraj Iyer, Yagnanarayanan Kalyanaraman, Sunil Prabhakar, Karthik Ramani, A Reconfigurable 3D Engineering Shape Search System Part II: Database Indexing, Retrieval and Clustering, 2003, Proceedings of ASME DETC'03 23rd Computers and Information in Engineering (CIE) Conference, Chicago, p. 1-10.*

Arya, S. et al., "An optimal algorithm for approximate nearest neighbor searching in fixed dimensions," Journal of ACM, vol. 45(6), 1998, 891-923.

Bauer, U., "Parametric reconstruction of bent tube surfaces," Proceedings of the 2007 International Conference on Cyberworlds (Oct. 24-26, 2007), International Conference on Cyberworlds, IEEE Computer Society, Washington, DC, 465-474.

Berkmeier, M. et al., "Determining the axis of a surface of revolution using tactile sensing," IEEE Transactions on Pattern Analysis and Machine Intelligence, vol. 15, No. 10, Oct. 1993, 1079.

Bosche, F., "'Model Spell Checker' for primitive-based as-built modeling in construction," Master of Science Thesis, Supervisor: Dr. Katherine A. Liapi and Dr. Carl T. Haas, Department of Civil, Architectural and Environmental Engineering, University of Texas at Austin, Dec. 2003.

Bosche, F. et al., "Automated retrieval of 3D CAD model objects in construction range images," Automation in Construction 17 (2008) 499-512.

De Toledo, R. et al., "Reverse engineering for industrial-plant CAD models," Proceedings of TMCE 2008, Apr. 21-25, 2008.

Ermes, P. et al., "A photogrammetric measurement method using CSG models," IAPRS, vol. 32, part 5/W11, 1999, pp. 36-42.

Fu, Y. et al., "Primitive shape extraction from unorganized point cloud data," Technical Report, Autodesk, 2010.

Fung, G., "A comprehensive overview of basic clustering algorithms," Jun. 22, 2001.

Gallup, D. et al., "Reverse engineering of pipe layouts and 3D point set damage models," Technical report of University of Utah, Dec. 27, 2004.

Jiang, X. et al., "A novel parameter decomposition approach to faithful fitting of quadric surfaces," Pattern Recognition: 27th DAGM Symposium, Lecture Notes in Computer Science, vol. 3663, 2005, pp. 168-175.

Kazhdan, M. et al., "Poisson surface reconstruction," Eurographics Symposium on Geometry Processing (2006) 61-70.

Ke, Y. et al., "Rotational surface extraction based on principal direction Gaussian image from point cloud," Journal of Zhejiang University, vol. 40, No. 6, Jun. 2006. (English abstract).

Konig, S. et al., "Consistent propagation of normal orientations in point clouds," Proceedings of of VMV, 2009.

Lukacs, G. et al., "Faithful least-squares fitting of spheres, cylinders, cones and tori for reliable segmentation," Fifth European Conf. Computer Vision, vol. I, 1998, pp. 671-686.

Lutton, E. et al., "Contribution to the determination of vanishing points using hough transform," IEEE Transactions on Pattern Analysis and Machine Intelligence, vol. 16, No. 4, Apr. 1994, 430.

Marshall, D. et al., "Robust segmentation of primitives from range data in the presence of geometric degeneracy," IEEE Transactions on Pattern Analysis and Machine Intelligence, vol. 23, No. 3, Mar. 2001, 304.

Mitra, N. et al., "Estimating surface normals in noisy point cloud data," International Journal of Computational Geometry & Applications, 4(4-5), Jan. 23, 2004, pp. 261-276.

Mount, D. et al., "ANN: A library for approximate nearest neighbor searching," http://www.cs.umd.edu/~mount/ANN/, 2010. (Page accessed Dec. 12, 2011.).

Pauly, M. et al., "Shape modeling with point-sampled geometry," Proceedings of ACM SIGGRAPH 2003, ACM Press, 2003, pp. 641-650.

Petitjean, S., "A survey of methods for recovering quadrics in triangle meshes," ACM Computing Surveys, vol. 2, No. 34, Jul. 2002, pp. 1-61.

Willis, A. et al., "Accurately estimating sherd 3D surface geometry with application to pot reconstruction," Proceedings of the 2003 Conference on Computer Vision and Pattern Recognition Workshop, vol. 1, 2003.

Rusin, D., "Topics on sphere distributions," http://www.math.niu.edu/~rusin/known-math/95/sphere.faq, Feb. 26, 1998. (Page accessed Dec. 12, 2011.).

Schnabel, R. et al., "Shape detection in point clouds," Computer Graphics Technical Reports, vol. 26, issue 2, 2006, pp. 214-226.

Shah, T. et al., "Automatic reconstruction of industrial installations using point clouds and images," Ph.D Dissertations of TU Delft, ISBN-10:90 6132 297 9, 2005.

Taubin, G., "Estimation of planar curves, surfaces, and nonpolar space curves defined by implicit equations with applications to edge and range image segmentation," IEEE Transactions on Pattern Analysis and Machine Intelligence, vol. 13, No. 11, Nov. 1991, 1115.

Rabbania, T. et al., "Segmentation of Point Clouds Using Smoothness Constraint," 2006, International Archives of Photogrammetry, Remote Sensing and Spatial Information Sciences, vol. 36, No. 5, pp. 248-253.

Ning, X. et al., "Segmentation of architectur shape information from 3D point cloud," 2009, VRCAI '09 Proceedings of the 8th International Conference on Virtual Reality Continuum and its Applications in Industry, pp. 127-132.

Lukacs, G. et al., "Geometric Least-Squares Fitting of Spheres," Cylinders, Cones, and Tori, 1997, RECCAD, Deliverable Document 2 and 3, COPERNICUS project, No. 1,068 (Budapest), Geometric Modelling Laboratory Studies,/1997/5, Computer and Automation Research Institute, Budapest, R.R. Martin and T. VaArady, eds.

PCT International Search Report and Written Opinion dated Apr. 26, 2013 for PCT Application No. PCT/US2013/026449.

Boykov, Y. et al., "Graph Cuts and Efficient N-D Image Segmentation", International Journal of Computer Vision, 2006, pp. 109-131, vol. 70(2), The Netherlands.

Briese, C., et al., "Applications of the Robust Interpolation for DTM Determination", Institute of Photogrammetry and Remote Sensing, Vienna University of Technology, 2002, pp. 55-61, vol. XXXIII, Vienna, Austria.

Douillard, B. et al., "On the Segmentation of 3D LIDAR Point Clouds", International Conference on Robotics and Automation, The Australian Centre for Field Robotics, The University of Sydney, Australia, 2011, Sydney, Australia.

El-Mehalawi, M. et al., A Database System of Mechanical Components Based on Geometric and Topological Similarity. Part I: Representation, 2003, Computer-Aided Design 35:83-94.

El-Mehalawi, M. et al., A Database System of Mechanical Components Based on Geometric and Topological Similarity. Part II: Indexing, Retrieval, Matching and Similarity Assessment, 2003, Computer-Aided Design 35:95-105.

Golovinskiy, A. et al., "Min-Cut Based Segmentation of Point Clouds," IEEE Workshop on Search in 3D and Video (S3DV) at ICVV, Sep. 2009.

Golovinskiy, A. et al., "Shape Based Recognition of 3D Point Clouds in Urban Environments," International Conference on Computer Vision (ICCV), Sep. 2009.

Hernandez, J. et al., "Morphological Segmentation of Building Facade Images," ICIP09—IEEE International Conference on Image Processing, 2009, Cairo, Egypt.

Kraus, K. et al., "Advanced DTM Generation from LiDAR DATA," Institute of Photogrammetry and Remote Sensing, Vienne University of Technology, 2001, vol. XXXIV, 3/W4, Vienna, Austria.

Kwon, S. et al., "Algorithms for fitting Cylindrical Objects to sparse range point clouds for rapid workspace modeling," 2003, Proceedings of the 20th International Symposium on Automation and Robotics in Construction (ISARC), Eindhoven, The Netherlands, p. 173-178.

(56) References Cited

OTHER PUBLICATIONS

Lou, K. et al., "A Reconfigurable 3D Engineering Shape Search System Part II: Database Indexing, Retrieval and Clustering," 2003, Proceedings of ASME DETC' 03 23rd Computers and Information Engineering (CIE) Conference, Chicago, p. 1-10.

Melkumyan, N., "Surface-based Synthesis of 3D Maps for Outdoor Unstructured Environments," Australian Centre for Field Robotics, Department of Aerospace, Mechanical and Mechatronics Engineering, The University of Sydney, Aug. 2008, Sydney, Australia.

Moosmann, F. et al., "Segmentation of 3D Lidar Data in non-flat Urban Environments using a Local Convexity Criterion," Intelligent Vehicles Symposium, 2009, IEEE.

Rusin, D., "Topics on sphere distributions," http://www.math.niu.edu/~rusin/known-math/95/sphere.faq, Feb. 26, 1998.

Schnabel, R., "Efficient Point-Cloud Processing with Primitive Shapes," 2009, Dissertation University of Bonn (Germany), pp. 6-53.

Trucco, E. et al., "Experiments in curvature-based segmentation of range data," PAMI 17(2), 1995, pp. 177-182.

Zhu, X. et al., "Segmentation and Classification of Range Image from an Intelligent Vehicle in Urban Environment," IEEE/RSJ International Conference on Intelligent Robots and Systems, 2010, pp. 1457-1462, Taipei, Taiwan.

* cited by examiner

PIPE RECONSTRUCTION FROM UNORGANIZED POINT CLOUD DATA

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/353,486, filed Jun. 10, 2010, by Yan Fu, Xiaofeng Zhu, Jin Yang, and Zhenggang Yuan, entitled "PIPE RECONSTRUCTION FROM UNORGANIZED POINT CLOUD DATA,";

This application is related to the following co-pending and commonly-assigned patent applications, which applications are incorporated by reference herein:

U.S. patent application Ser. No. 12/849,670, entitled "PRIMITIVE QUADRIC SURFACE EXTRACTION FROM UNORGANIZED POINT CLOUD DATA", by Yan Fu, Xiaofeng Zhu, Jin Yang, and Zhenggang Yuan, filed on Aug. 3, 2010, which application claims priority to Provisional Application Ser. No. 61/353,492, filed Jun. 10, 2010, by Yan Fu, Jin Yang, Xiaofeng Zhu, and Zhenggang Yuan, entitled "PRIMITIVE QUADRIC SURFACE EXTRACTION FROM UNORGANIZED POINT CLOUD DATA,";

BACKGROUND OF THE INVENTION

1. Field of the Invention

The present invention relates generally to three-dimensional (3D) modeling, and in particular, to a method, system, apparatus, and article of manufacture for reconstructing a pipeline in a 3D computer-aided design (CAD) modeling system.

2. Description of the Related Art (Note: This application references a number of different publications as indicated throughout the specification by the first author and year of publication enclosed in brackets, e.g., [x]. A list of these different publications ordered according to these author and year of publications can be found below in the section entitled "References." Each of these publications is incorporated by reference herein.)

Complex industrial environments are often modeled in a CAD system both during the creation and the maintenance of such an environment. However, industrial facilities are often very dynamic environments, where constant changes are required to improve health and safety, to increase efficiency, and to reduce hazardous emissions in accordance with the environmental regulations [Tahir 2005]. As a result, a big gap exists between the documented model and the as-built situation. It is not cost-effective and practical to update these models at the end of construction or after each and every change. The situation is even worse for old sites, as most of them were initially designed using old two-dimensional (2D) CAD techniques and there is no 3D model available. Consequently, up-to-date as-built 3D information is required in both cases when new changes are planned.

To model an industrial environment, 3D scanners (e.g., laser scanning) are often used to obtain a set of vertices in a 3D coordinate system (referred to as a point cloud). Recent advances in 3D scanning technologies have made the fast acquisition of dense and accurate point cloud data possible with moderate costs. The use of a laser scanner for 3D reality capture has grown considerably in the last few years, especially for industrial reconstruction applications. To convert point cloud data into CAD models, modeling is a necessary step because it can provide better accuracy and make the resulting models fit well with following engineering workflow.

The modeling of complex industrial environments is a difficult task for engineers in various domains such as oil industries, plant industrial, and transport industries. For pipeline extraction, most of the commercial systems require time-consuming and skillful manual data analysis to segment the original data at an object level. In addition, customers have many expectations for 3D object recognition systems including [Bosche 2008]:

Accuracy: Correctly extract 3D objects from the point cloud data;

Efficiency: The speed of 3D object extraction;

Robustness: The performance of the system. There are always partial or significant occlusions in the scan data. A robust system should be able to handle the occlusions; and Level of automation: Users will be satisfied if the system could be less manually intensive.

When designing an industrial installation, construction engineers often make use of a library of standardized CAD components. Such a library may contain straight pipes, elbows and T-junctions. Traditionally, pipes can be reconstructed from point cloud data by selecting and connecting the appropriate components from the library. However, such a manual selection process is time-intensive and inefficient. Accordingly what is needed is the capability to automatically detect shapes and obtain a complete pipeline based on point cloud data without requiring manual selection from a library. To better understand the invention, a further description of related works is beneficial.

In [Lee et al. 2000], a pipe surface is defined by a spine curve and a constant radius of a sweep sphere. In Lee, a point cloud is reduced to a thin curve-like point set by using shrinking and moving least square methods. The curve like point set is then approximated with a spine curve. To apply Lee's approach, the point set of the pipe surface is segmented from the massive point cloud in advance. The resultant pipe surface is a curved swept surface, which does not meet the actual configuration of pipes in the industrial plants.

[David & Thomas 2004] proposed techniques to recognize various pipes and pipe features from depth images, and then obtained pipe layout information. David & Thomas identified cylinders by the principle curvatures and directions of the points. The principle direction whose corresponding curvature is zero is regarded as the orientation of the cylinder. The reciprocal of the non-zero curvature is the negative radius of the cylinder. However, David & Thomas' method does not work well in a crowded plant environment.

As described above, when designing an industrial installation, construction engineers often make use of a library of standardized CAD components; such a library may contain straight pipes, elbows and T-junctions. Traditionally, pipes can be reconstructed from point cloud data by selecting and connecting the appropriate components from the library. To make this process more automated, the primitive shapes may be automatically detected from the point cloud data instead of manually selecting such shapes from the library. Automatic shape detection has been proposed in [Schnabel 2007]. However, Ruwen failed to discuss how to check and correct the primitive shapes to obtain a complete pipeline.

[Rodrigo et al. 2008] retrieved the geometric primitives from a tessellated database instead of from point cloud data directly. Rodrigo's algorithm starts by using segmentation and then classifies the segmented surface into cylinders, cones, torus, or some other shape. The surface parameters are then found to correctly fit the input data. The ability to organize geometric primitives is not explored in Rodrigo's work.

[Bosche 2003] also aimed to generate primitive-based as-built modeling in construction; however, the primitive shapes are acquired by human-assisted sparse range points collection and then fitting to sparse range points. This process is dynamic and involves extensive human intervention, and the fitting result is not satisfactory. Bosche also proposed to reconstruct 3D CAD model objects by recognizing the objects from site range images and then converting the object surface into a tessellation of triangles (STL surface). Such representation does not contain semantic information such as the center line of the pipeline. As a result, the as-built parameters had to be calculated further based on the poses of the mesh vertices. Such an approach is not acceptable for actual field implementation.

[Tahir 2005] proposed to fit a pipeline to the point cloud by CSG fitting with enforced internal constraints on the cylinder components after the components are extracted individually. This fitting approach should be combined with a database of CSG models to be used for object recognition in point clouds.

CLOUDWORX™ produced by Leica can also extract a pipeline semi-automatically. It requires the user to snap to a node on the center line of the pipe run to serve as seeds to guide the generation of a pipe run. Once a point cloud is loaded and opened, the program calculates the center and diameter of a pipe run by selecting one point on the surface of the pipe cylinder. Once all parameters are set, the user can accurately place piping components using point cloud data in the model.

SUMMARY OF THE INVENTION

As the industrial environment is mainly composed of pipelines that consist of simple primitives such as cylinders, cones and torus segments, embodiments of the invention provide an automatic shape detection approach that extracts the primitive components from the point cloud instead of manually selecting from the library. Moreover, the geometric and topological constraints implied in the well-defined CAD objects of industrial sites provides useful information that can be employed to make the modeling process of industrial reconstruction more intelligent and automatic. In one or more embodiments, elbows can be either automatically detected in point cloud data or intelligently derived from its connections by comparing the data to data in the component library. With the modeled components, pipe runs can be connected either manually or automatically.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

An automatic shape detection algorithm is used in pipeline reconstruction application to model the primitive shapes in a point cloud. This algorithm is based on basic primitive shape fitting. The automatic detection process is of a random sampling that is then propagated. The models obtained by primitive modeling are usually not completed because there may be some parts not modeled. Accordingly, to make the pipeline complete, approaches to correct, deduce and model the missed objects are brought out to complete the pipeline modeling.

Hardware Environment

Figure 1:
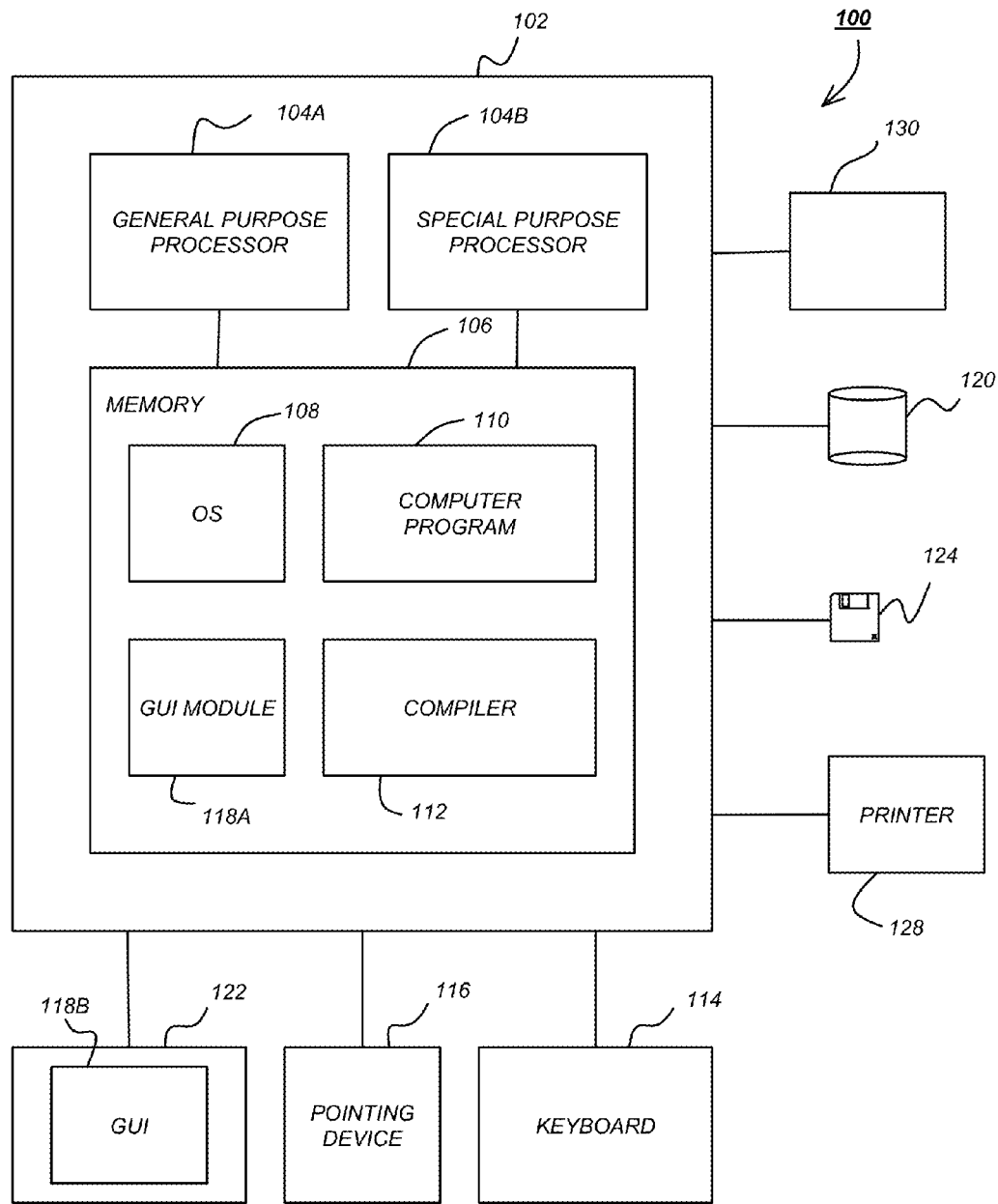
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A onto a GUI 118B in display 122. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that all computers 102 described herein may include portable devices such as cell phones, notebook computers, pocket computers, or any other device with suitable processing, communication, and input/output capability.

In addition, all of the actions and components described herein may be provided by such a computer 102, computer program 110, or other component of FIG. 1.

Automatic Shape Detection

Embodiments of the invention provide two strategies for pipe extraction: (1) content-based pipe extraction; and (2) quadratic surface segmentation techniques. In content-based pipe extraction, a content database is available. Straight pipes, major component in pipe systems, are equivalent to cylinders. Thus, automatic cylinder detection may be used to detect all the straight pipes in the point cloud data. Thereafter, the results are compared with the content in the database. The elbows are modeled according to the content database. When a content database is not available, quadric surface segmentation techniques may be used to extract the primitive shapes in the point cloud data. Cylinder, torus, cones, and other shapes may be extracted in such analysis (the torus segment may be used to model an elbow).

Automatic Cylinder Detection

Figure 2:
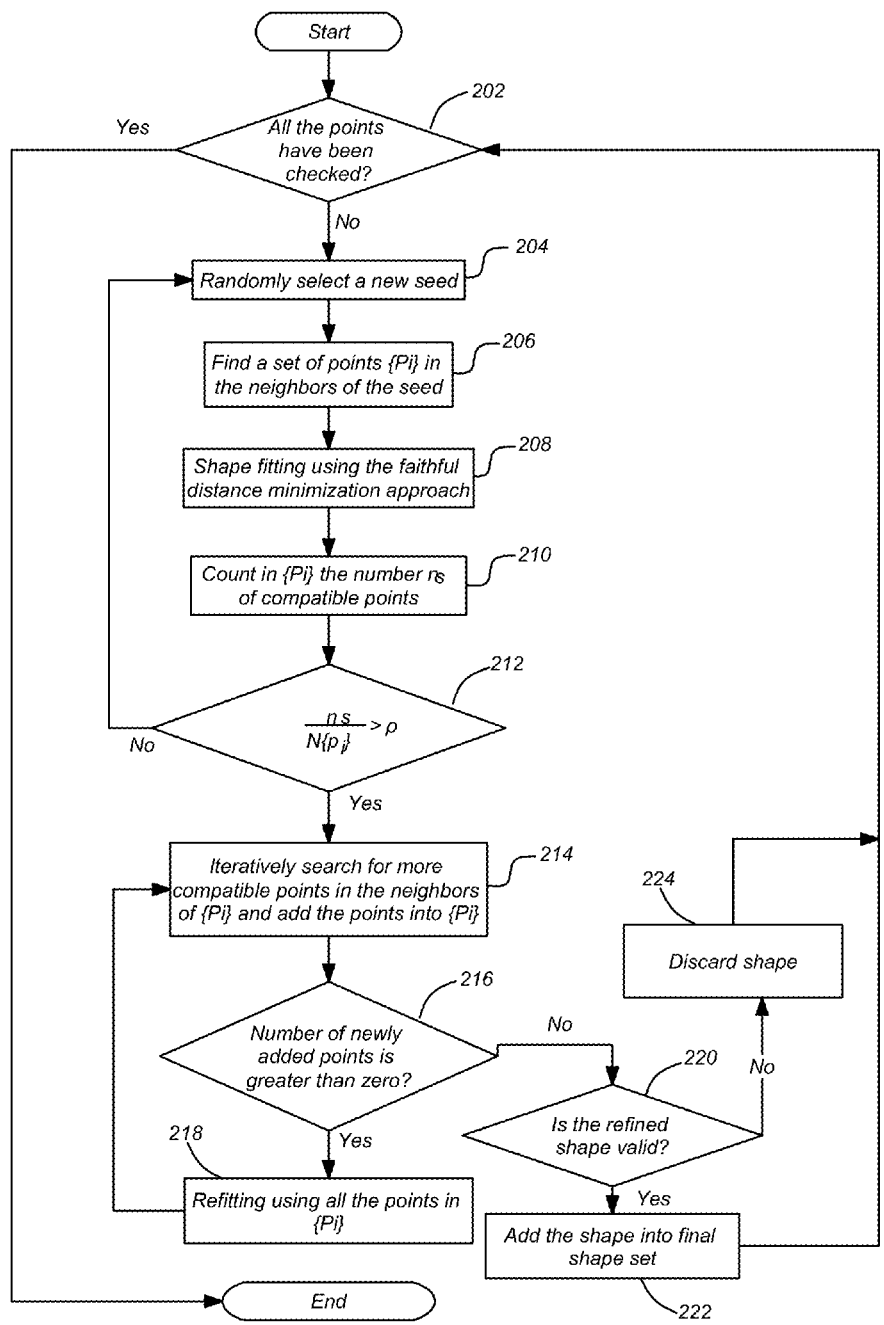
FIG. 2 is a flow chart illustrating the automatic cylinder detection in accordance with one or more embodiments of the invention.

FIG. 2 is a flow chart illustrating the automatic cylinder detection in accordance with one or more embodiments of the invention. A general workflow for automatic geometric primitive shape extraction is based on generalized RANSAC (random sample consensus) methods [Schnabel 2007]. A determination is first made at step 202 whether all the points in the point cloud have been checked. If not, a seed point is randomly selected (from the unchecked points) at step 204. A set of points $\{P_i\}$ in the neighborhood of the seed point are found at step 206. Accordingly, in this approach, the extraction of a primitive shape is performed using random sampling in a set of points.

Each sample set contains a number $N_S$ of points necessary to define an initial instance of the primitive shape $S_0$. The faithful distance minimization approach proposed in technical report [Fu 2010] is used for surface fitting at step 208 (i.e., to fit/determine a candidate shape based on the points).

A scoring function is used to measure the likelihood of the candidate shapes. The scoring function involves the following two measurements:

The measurement of the support of a candidate, that is resembled by the number of points whose Euclidean distance to the candidate shape is less than $d_{th}$ To ensure the point following the curvature pattern of the candidate primitive shape, only the points whose normal deviation from the normal of the shape does not exceed $\alpha_{th}$;

The number $n_s$ of points that satisfy both the above two measurements is the value of the scoring function. If the ratio between $n_s$ and $N_S$ does exceed a predefined threshold $\rho$ (at step 212), then the shape is justified to be an invalid candidate primitive shape and the process returns to step 204.

If the ratio does not exceed the threshold $\rho$, the candidate shape is used as an initial shape for further shape extraction from the point set. This shape extraction is performed ate step 214 using an iterative optimization process that iteratively adds (into the point set) neighboring points lying on the surface of the primitive, i.e. the points satisfying a stricter condition as following:

$$Dist(p_i, S_0) < d_{th}/3 \text{ and } \arccos(N_{pi}, N_{S(pi)}) < 0.98\alpha_{th} \quad (1)$$

This stricter condition is used in order to ensure the inclusion of points on the surface despite of the existence of noise. It may be noted that rather than using the multiplier/percentage 0.98, a different percentage value (e.g., 100% or less than 98%) of $\alpha_{th}$ may be used. A determination is made at step 216 whether new points have been added. After all of the compatible points have been found, the shape is refitted at step 218 to a refined primitive $S_1$, that is used for further conforming points searching. This process (i.e., steps 214-218) is repeated until no conforming points exist.

Once there are no more conforming points, the refined primitive also needs further checking to determine whether it is a valid shape (e.g., at step 220): for a cylinder, its diameter should not exceed the maximum diameter of the standard straight pipes. If the refined primitive is not a valid shape (as determined at step 220), the shape is discarded at step 224 and another seed point is selected for another cylinder detection via the process returning to step 202. Otherwise, this shape is regarded as a matched shape and it is pushed into a final shape set at step 222. Further, the points that have been checked in this analysis are marked as "visited." Another seed is selected to detect a new shape (i.e., at step 204). This process is iterated until all the points have been marked as "visited" (i.e., once all points have been checked as determined at step 202).

For pipe extraction application, only cylinders may be considered for embodiments of the invention (described in FIG. 2) because they are very common in various types of sites and constructions. The information of the detected cylinder shapes includes: axis vectors, centers, diameters, lengths. This information can be used for further pipe run modeling.

Automatic Quadric Surface Segmentation

Detecting instances of primitive geometric shapes in the unorganized point cloud data can quickly derive higher levels of abstraction. In the work of pipe models extraction, only cylinders and tori are considered but additional primitives can also be included. Thus, while FIG. 2 describes the flow for cylinder detection, FIG. 3 illustrates the logical flow for detecting torus and/or other quadric surface segmentations in accordance with one or more embodiments of the invention (i.e., a determination is made regarding what kind of shape is found in the point cloud data).

Figure 3:
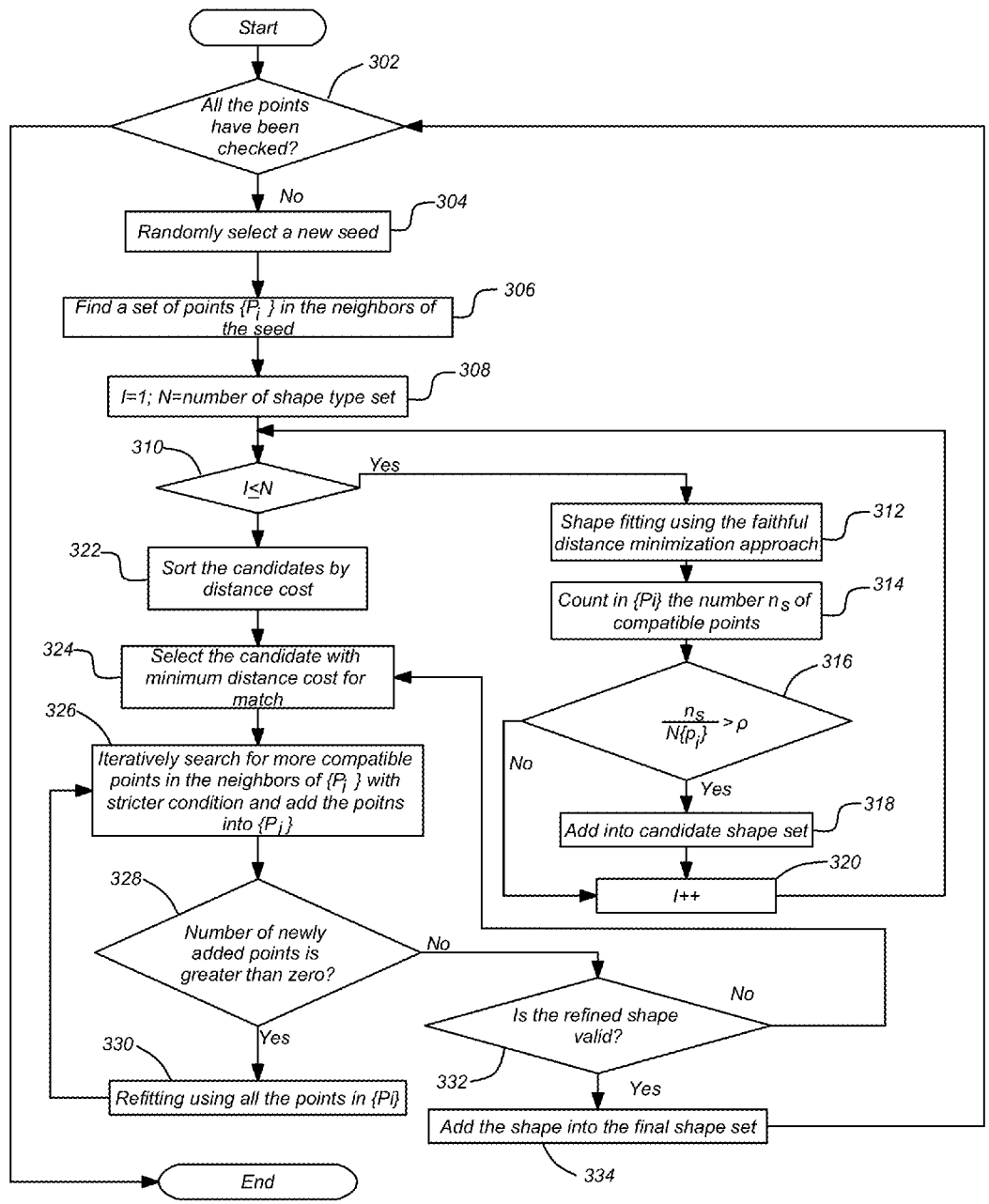
FIG. 3 illustrates the logical flow for detecting torus and/or other quadric surface segmentations in accordance with one or more embodiments of the invention.

The workflow of FIG. 3 is similar to that of automatic cylinder detection (of FIG. 2), while the difference is that more than one kind of quadric shapes is detected from the point cloud data, i.e. an additional process is required to distinguish the different quadric shapes.

Accordingly, the process begins at step 302 where a determination is made regarding whether all shapes have been checked (e.g., visited). Each time a new seed is selected at step 304, all of the candidate shapes are fitted to a set of neighboring points of the seed (i.e., at step 306) and the same score function (of the automatic cylinder detection of FIG. 2) is used to measure the likelihood of each shape candidate. Steps 308-320 are used to obtain a list/set of the candidate shapes that fit the points. In other words, steps 308-320 are used to determine what points fit into which type of candidate shape. If a new shape is found, it is added to the candidate shape list. After the candidate shape list is completed, a determination can then be made regarding which candidate shape the point set matches.

Thus, at step 308, the initial parameters for the building of the candidate shape list are set with I equal to 1 and N as the number of shape type sets (i.e., the total number of types of shapes possible). The list of candidate shapes is iteratively performed (via determination step 310) as long as the value of I (which is incremented for each possible shape evaluated) is less than that total number of possible types of shapes available to select from. In other words, the value of N defines the total number of shapes that are possible to select from and the evaluation proceeds until each of those shapes have been evaluated and either added to a candidate shape list or discarded as not being compatible.

To provide the evaluation, similar to FIG. 2, based on the identified point set (from step 306), a fitting shape is identified using the distance minimization approach at step 312. The number of compatible points for the shape in the point set is determined at step 314.

If the ratio between the number of conforming points $n_s$ and $N_S$ exceeds a threshold $\rho$ (as determined at step 316), then the shape is considered to be a potential candidate shape. The candidate shape is then pushed into a priority queue at step 318 and the number of shapes (I) that have been evaluated is incremented at step 320. If the shape is not a potential candidate shape, it is not added to the candidate shape set and the process proceeds my incrementing number of shapes evaluated (I) at step 320.

Once all of the candidate shapes are found, the process can continue past step 310 to determine the candidate shape that this point set matches best. At step 322, all of the candidate shapes are sorted by the distance functions that measure the sum of the Euclidean distance from the conforming points to the candidate surface. The candidate shape with the minimum distance costs for the match is selected at step 324. This candidate shape with the minimum distance for testing is used to find out more points satisfying a stricter condition to grow the candidate shape from the seed at step 326:

$$Dist(p_i, S_0) < d_{th}/3 \text{ and } \arccos(N_{Pi}, N_{S(pi)}) < 0.98\alpha_{th}$$

Note that a threshold value other than 98% may also be used (e.g., 100% or a value higher/lower than 98%). Steps 328 determines whether new compatible points have been found or not. While the compatible points are found/added (per step 328), the shape (with the new conforming points) is refitted to a refined primitive $S_i$ at step 330, that is used for further conforming points searching. This process is repeated (e.g., via step 326) until no additional conforming points exist (i.e., have been added).

Once all conforming points are found (i.e., no new points have been added per the determination at step 328), the refined primitive also needs further checking to determine whether it is a valid shape at step 332: for a cylinder, its diameter should not exceed the maximum diameter of the standard straight pipes; for a torus, its major radius should not exceed the maximum major radius of the standard elbows. If the refined primitive is not a valid shape, this shape is discarded and another candidate in the priority queue is selected for a match while the process continues back at step 324. Otherwise, this shape is regarded as a matched shape and it is pushed into a final shape set at step 334.

An exemplary case of fitting a point set with a torus may be used to illustrate the process of FIG. 3. With a point set, the potential shapes may be a cylinder or torus. If a small point set is utilized, one may not be able to distinguish between a cylinder and a torus with a large radius. Thus, both the cylinder and torus should be considered to determine which shape is the real shape and the best fit for the point cloud data. The right side of FIG. 3 (i.e., steps 312-320) is used to select/determine the candidate shapes;

After selecting the candidate shapes (i.e., cylinder and torus), new points may be added to the point set and new points are continuously added until no more potential points are available. Thereafter, an attempt is made to refit the point set to a new shape. In this regard, the left side of FIG. 3 (i.e., steps 322-334) are used to examine which candidate shapes are the real shape. Thus, when each point is added, a check is made to determine if the shape is valid. The check for validity, the parameters of the shape may be examined. For example, if one tries to fit a point from a torus on a cylinder, the distance may be too far to be a valid shape. In this regard, there is a threshold distance—once the threshold distance has been exceeded, the point cannot be a valid point for the candidate shape. In other words, if the distance between the point and the shape is greater than the threshold, the point cannot lie on the surface of the shape and therefore, the shape and/or point do not match (i.e., are not valid).

If the point does not lie on the surface, the number of points that do not match the candidate shape can be summed. If the number of points is extensive, a determination can be made that the current shape is not a valid shape for the point set and the process returns to the list of candidate shapes. Alternatively, one can look to the parameters of the shape for validity—if the major radius is too big, it is not a valid torus. Similarly, if the minor torus is too large, it may not be valid (e.g., if the minor radius exceeds 10 meters). Thus, as part of the validity determination (e.g., at step 332), parameters may be examined and compared to certain thresholds to determine whether the shape remains valid.

Once a matching shape is found, it is automatically placed into the final shape set (which consists of the series of valid shapes).

In summary of the above, the user first selects an area that contains a pipeline. Thereafter, a determination is made regarding whether the area contains shapes. If a point does not belong to any sequence, the point is marked. At the beginning of the flow chart of FIG. 3, an examination is made to see if all of the points have been checked (i.e., at step 302). Seed points are then examined, point sets are determined (i.e., at step 306) and classified to a part (steps 310-334). If a part is not classified to a particular part, it is selected as the new seed point to begin the analysis at step 304.

Primitive Pipe Components Connection

Once the valid shapes have been identified, the pipe components modeled by primitive modeling are not completed because some of the parts are not modeled. Further efforts are required to deduce and model the objects that are not scanned to complete the model. In other words, some of the points (and the components represented by such points) may not have been scanned in the point cloud. Such points and their respective components should be determined and the connection between components should be established.

Determination of the Predecessors

The information of the detected cylinder shapes includes: axis vectors, centers, diameters, and lengths. The predecessor information is still needed for all of the pipes constituting a pipeline. A predecessor and successor are defined as those components in the pipeline that precede or follow a particular shape/component. The predecessors of the straight pipes can be either manually or automatically determined. After the cylinders are detected from the point set (i.e., per FIGS. 2 and 3 above), the user can manually specify the order of the cylinders in the pipe run by selecting the cylinders one by one. Alternatively, embodiments of the invention may automatically (and without additional user input) start from an arbitrary cylinder and then iteratively find the predecessors and successors of the cylinders by searching for the nearest cylinder to the ends of the cylinder. The later approach may generate confusion if the connection organization is too complicated.

Pipe Correction

The pipe correction process is to correct the errors in the data acquisition and modeling process and combine/connect the primitive shapes by missing parts [Bosche 2003]. In industrial environment modeling applications, the constraints between different primitives in industrial facilities can be more easily specified and thus providing more useful information during modeling.

Diameter Correction

Figure 4:
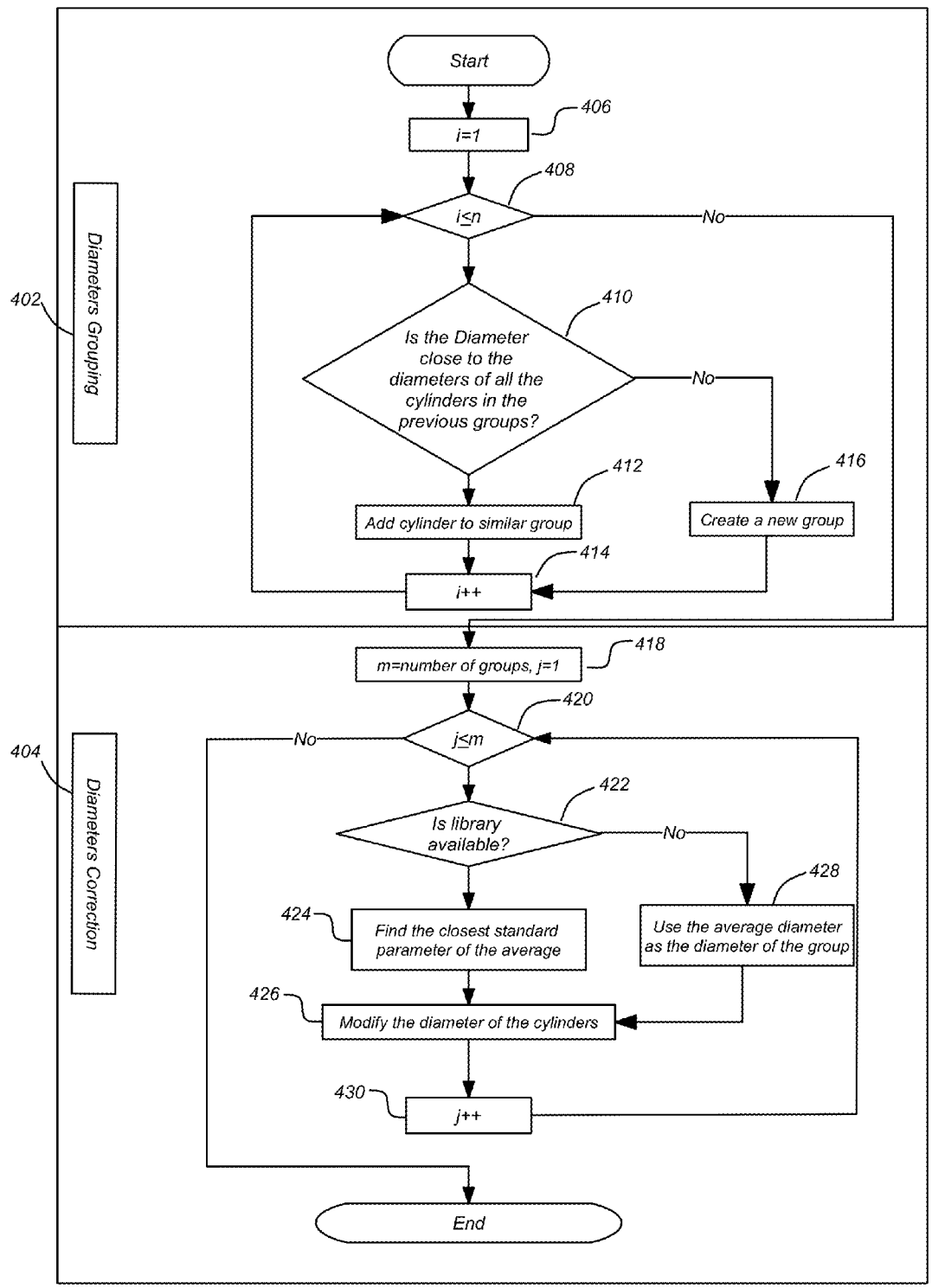
FIG. 4 is a flow chart illustrating the diameter correction process in accordance with one or more embodiments of the invention.

Cylinders belonging to the same pipe-run should have the same diameter. However, in the fitting process described above, the determination of the radius of the cylinder and the minor radius of the torus may not be that accurate. Accordingly, a determination is necessary to classify which components connect to each other. Such connected components need to have the same radius/diameter. FIG. 4 is a flow chart illustrating the diameter correction process in accordance with one or more embodiments of the invention. The correction process involves two primary steps—diameter grouping 402 and diameter correction 404. In the diameter grouping 402, components are checked one by one. A first component is selected and an initial diameter is checked to determine how similar the diameter is to a shape. Similar components that have similar diameters are grouped together. Diameter correction 404 is achieved by checking the dimension of the detected primitives and comparing them to a set of standard components (e.g., a library of standard components). The diameter is corrected based on a standard matching diameter. If no match is found, the average diameter of the group is used. A detailed walkthrough of this flow follows.

In the first of the analysis, the pipes with similar diameters are grouped together (402). The definition of 'similar' is that there is less than 5% internal deviation among the grouped cylinders. Note that a threshold value other than 5% may also be used (e.g., 7% or a value higher/lower than 5%). In FIG. 4, each pipe component is examined where n is the total number of pipe components. Thus, starting at the first pipe component (i.e., via step 406), the grouping process 402 is iteratively processed via determination 408 (via step 414) until all of the components have been examined. At step 410, a determination is made regarding whether the diameter of the component being examined is close (i.e., within 5% deviation) to cylinders in an already existing group. If the currently examined component/cylinder is similar to one of such groups, then the cylinder is added to the similar group of cylinders at step 412. If there is no similar group for the component/cylinder, a new group is created at step 416. This grouping process 402 continues until each component/cylinder has been examined at which point the process continues with the diameter correction process 404.

The diameter correction process 404 iteratively examines each group (where the iterative process is controlled via steps 418-420 and 430). If the library of a pipe component is provided (as determined at step 422), the average of the diameters is compared to the standard diameters (in the library) at step 424. The closest standard diameter is selected as the diameter of all the cylinders in the group at step 426. In other words, the diameter of all the cylinders in the group is modified to match the closest standard diameter from the library. If a library is not available (as determined at step 422), the average value is used to define the diameter of the cylinders of the group at step 428.

Coplanarity Correction

Once the diameters are corrected, the plane on which each component lies must be corrected in order to ensure than the 3D view of the model is accurate. In the process of primitive shape fitting, it is possible that the estimated axis has some extent (3%) of deviation from the actual axis, which causes the problem that the extract primitives are not in the exact position for combination. Coplanarity is an important feature for primitives to be connected; otherwise the primitives cannot be actually connected. Therefore, coplanarity correction is necessary before the pipe merge.

Figure 5:
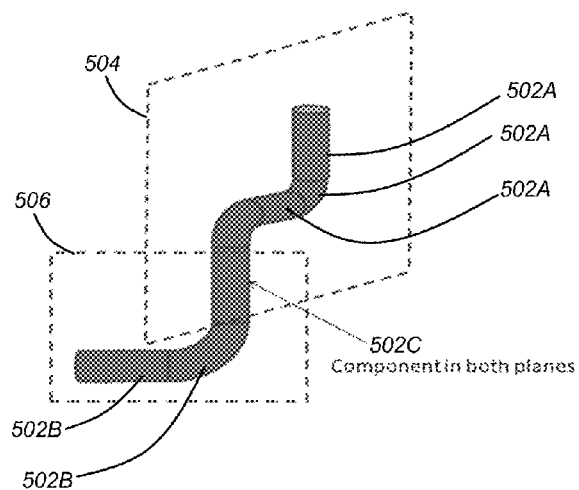
FIG. 5 illustrates an example of a pipe-spool on two planes in accordance with one or more embodiments of the invention.

FIG. 5 illustrates an example of a pipe-spool on two planes in accordance with one or more embodiments of the invention. Various pipe segments/components 502A, 502B, and 502C lie on plane 504, plane 506, or both planes 504 and 506. In this regard, while components 502A lie on plane 502A, components 502B lie on plane 506, and component 502C lies on both planes 504 and 506. Accordingly, the group of straight pipes 502 constituting a pipe-run may belong to different planes 504 and 506. Before the coplanarity correction, we need to determine which groups can be considered as co-planar, which is heuristically built by processing one cylinder at a time [Bosche 2003].

Figure 7:
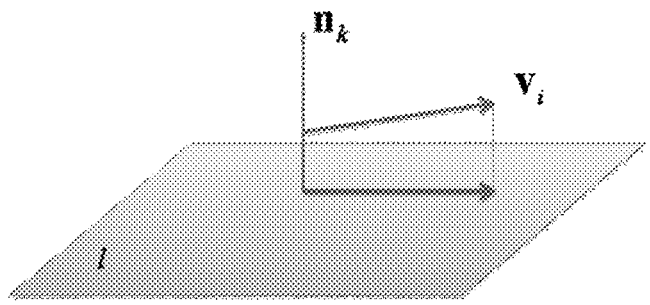
FIG. 7 illustrates a projection of the vector $V_i$ to plane l in accordance with one or more embodiments of the invention.
Figure 6:
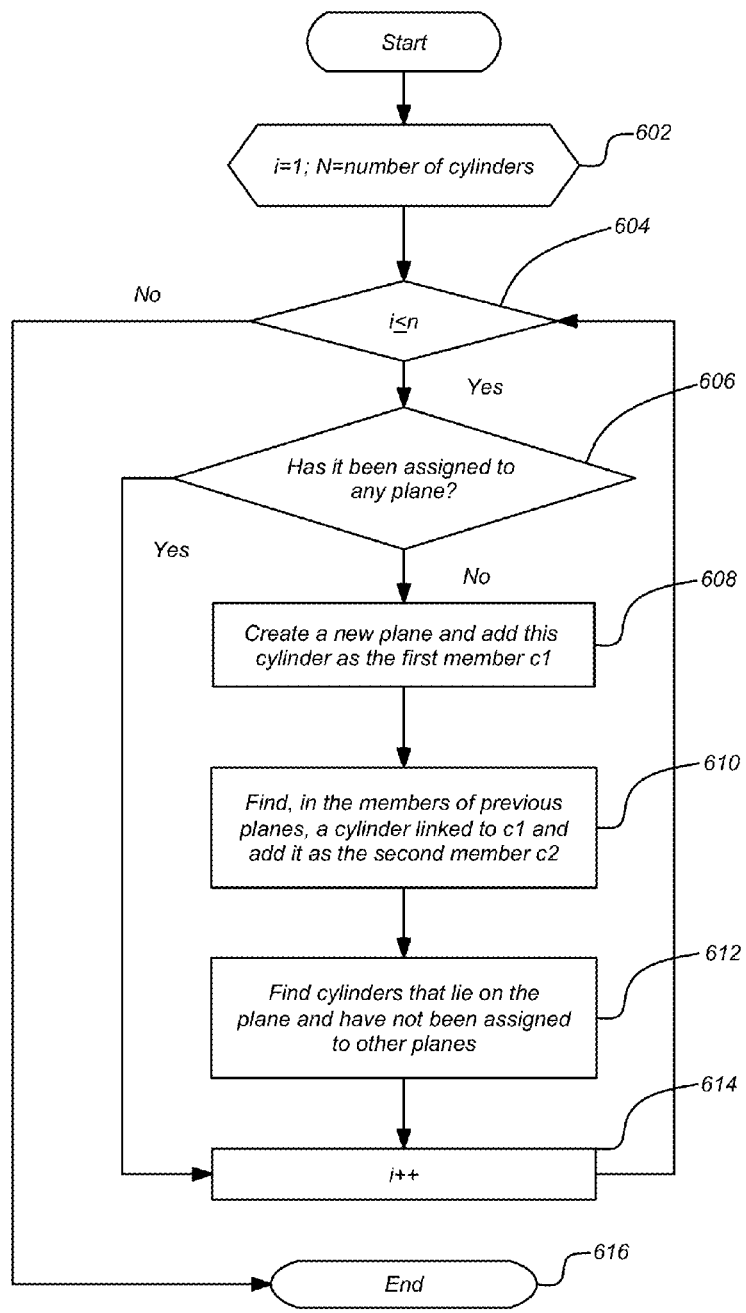
FIG. 6 is a flow chart illustrating the logical flow for coplanar cylinder grouping in accordance with one or more embodiments of the invention.

FIG. 6 is a flow chart illustrating the logical flow for coplanar cylinder grouping in accordance with one or more embodiments of the invention. As part of the flow, each cylinder/component is examined one at a time to determine/assign the cylinder/component to a plane. Steps 602 and 604 ensure that each cylinder/component is examined. At step 606, a determination is made regarding whether the cylinder/component has been assigned to any plane. To determine if a cylinder belongs to a plane l, two conditions need to be checked: firstly, it must have a predecessor or successor lying in the plane l; the other condition (as illustrated in FIG. 7) is that the deviation between the length of the axis of the testing cylinder ($n_k$) and the length of its projection ($V_i$) on plane l should not exceed 3% (of the projection $V_i$), which can be formulated as:

$$\frac{|n_k - v_i|}{\|v_i\|} > 97\% \quad (2)$$

Note that a threshold value other than 97% may also be used (e.g., 100% or a value higher/lower than 97%). Accordingly, FIG. 7 illustrates a projection of the vector $V_i$ to plane l in accordance with one or more embodiments of the invention.

If at step 606, the cylinder/component has not been assigned to any plane, a new plane is created and the cylinder is added to the new plane as the first member (c1) at step 608.

At step 610, the previous planes are examined to find any cylinders that are linked to cylinder c1. If any other cylinders are found, the found cylinders are added to the new plane as a second member c2.

At step 612, cylinders that lie on the plane and have not been assigned to other planes are identified and the process returns via step 614 up to step 604 to ensure all cylinders/components have been examined. Once all cylinders have been examined the grouping process is complete at step 616.

Once the group of the cylinders in a plane has been determined (via FIG. 6), the position of the cylinders grouped in one plane should be corrected to be coplanar. Specifically, the task is to find an optimal average plane from the axes of the cylinders in the same plane. To optimally define the consecutive planes sharing a common component, planes are processed one by one and the axis of the common component is fixed to involve the information of the predecessor plane.

Figure 8:
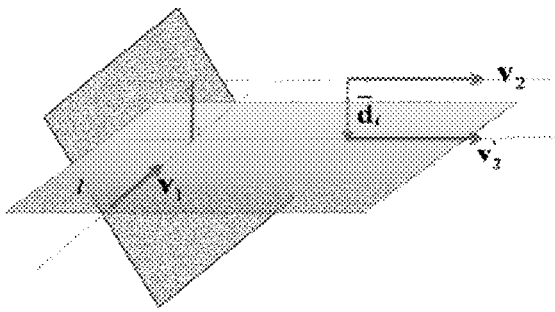
FIG. 8 illustrates the correction of a cylinder axis $V_2$ to optimize the plane defined by two cylinders in accordance with one or more embodiments of the invention.

For planes consisting of two cylinders, only the axis $v_2$ of one cylinder needs to be adjusted since the other axis $v_1$ has been fixed by its predecessor plane. In this case, only the second vector $v_2$ needs to be translated so that it is coplanar with $v_1$. FIG. 8 illustrates the correction of a cylinder axis $v_2$ to optimize the plane defined by two cylinders in accordance with one or more embodiments of the invention. The new cylinder axis vector $v'_2 = v_2 - \vec{d}$, where $\vec{d}$ is the vector from the line of $\vec{v}_2$ to its closest point on the line $v_1$. Accordingly, vector $v_2$ is translated to $v'_2$ to be coplanar with $v_1$.

For planes consisting of more than two cylinders, the normal of an optimized plane is obtained by least square fitting a plane to the centers of the cylinders, and the position of the plane is determined by the center of the shared cylinder. All of the cylinders are then corrected by projecting their axes to the optimized plane.

Angle Correction

Figure 9:
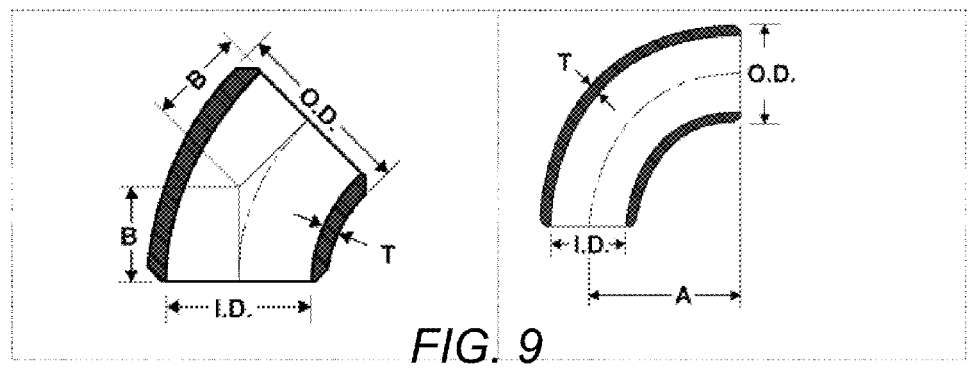
FIG. 9 illustrates examples of two standard elbows in accordance with one or more embodiments of the invention.

Once the diameter correction and coplanar correction has been performed, it may still be necessary to correct the angles of the various components in order to connect them together. In this regard, to connect two successive cylinders with standard components, the angle between the cylinders should be corrected. Firstly the angle between the axes of the two cylinders is computed and then it is compared to the standards in the component library to find out the closest standard angle. FIG. 9 illustrates examples of two standard elbows in accordance with one or more embodiments of the invention. The two standard elbows have angles of 45° and 90° respectively. FIG. 9 illustrates the inner diameter (I.D.), outer diameter (O.D.), wall thickness (T), radius center to end for 45° (B) and radius center to end for 90° (A).

For the cylinders constituting a pipeline, a global optimization should be performed so that the sum of the angle adjustment is minimized. Such an optimization may be in accordance with the following equation:

$$F(v'_0, v'_1, \ldots, v'_n) = \sum_{i=0}^{n} A(v'_i, v_i), \quad (3)$$

Where $A(v'_i, v_i)$ denotes the angle between the original cylinder axis and the adjusted cylinder axis.

Connector Modeling

Once the components have all been adjusted as described above, all of the shapes/components need to be connected together (e.g., via connectors such as cylinders or elbows). In this regard, certain parts/components may not be modeled (e.g., they lie behind other parts or are not part of the scanned point cloud data). To model the connections, one examines the planes and center lines to connect two components/parts. If two parts are on the same plane and the center line is on the same line (or the approximate same line), the parts can be connected. The angles between two parts may also be examined to determine if an elbow connection is appropriate. In this regard, one may first examine components for coplanarity. Thereafter, center lines and angles may be compared. Standard parts or parameters of such standard parts may be used to model the connectors.

When the pipe component library is available, the elbows are defined by the diameters of the straight pipes they connect and the angle between the connected straight pipes. Otherwise, the diameter of the detected torus segment between two straight pipes defines the diameter of the elbow connecting the two straight pipes.

Usually the standard angles include 0°, 45°, and 90°. When the angle is close to 0°, the middle point of the centers of two cylinders are computed and the cylinders are merged by simply extending the cylinder; as shown FIG. 10, the centers $c_i$ of the cylinder are moved to:

$$c_i' = c_i + \vec{v}_i \left( \frac{1}{2} |\overrightarrow{c_1 c'}| - \frac{1}{4} l_i \right) \cdot \text{sgn}(\vec{v}_i \cdot \overrightarrow{c_1 c'}) \quad (4)$$

And the length of the new cylinder becomes:

$$l_i' = |\overrightarrow{c_1 c'}| + \frac{1}{2} l_i \quad (5)$$

Figure 10:
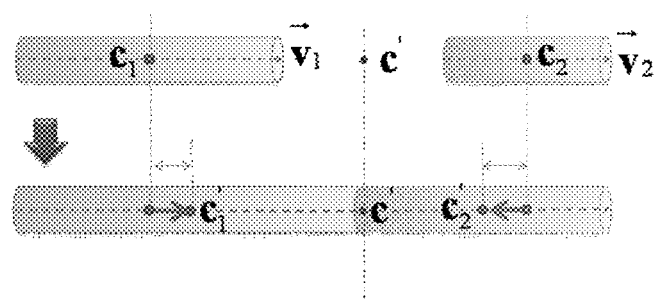
FIG. 10 illustrates the connecting of two straight pipes on the same line in accordance with one or more embodiments of the invention.

Thus, FIG. 10 illustrates the connecting of two straight pipes on the same line in accordance with one or more embodiments of the invention. Since the center of each cylinder lies on the same vectors $v_1$ and $v_2$ with centers $c_1$ and $c_2$ that are on the same line, the cylinders are merely extended to meet each other as illustrated in the bottom portion of FIG. 10.

Figures 11A, 11B:
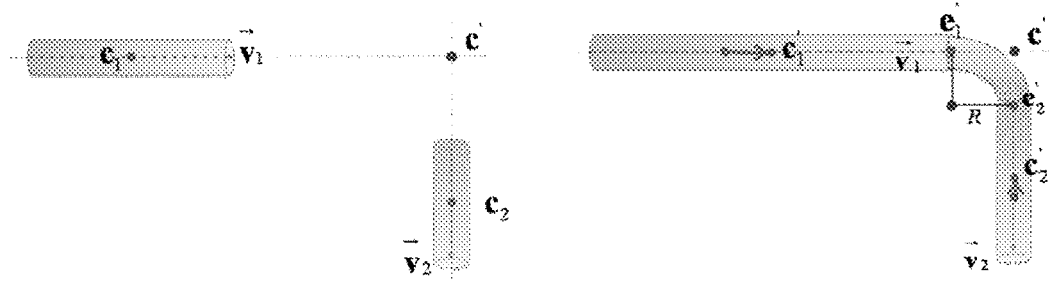
FIGS. 11A and 11B illustrate an elbow that is modeled to connect the two straight pipes in accordance with one or more embodiments of the invention.

When the angle between the two straight pipes is 45° or 90°, an elbow should be modeled to connect the two straight cylinders. FIGS. 11A and 11B illustrate an elbow that is modeled to connect the two straight pipes in accordance with one or more embodiments of the invention. Firstly the intersection point c' is computed. When the pipe component library is available, the radius of the elbow is defined according to the library; otherwise, the major radius of the torus segment is used to define the radius of the elbow. Then the centers $c_i$ of the cylinder are moved to:

$$c_i' = c_i + \vec{v}_i \left( \frac{1}{2} |\overrightarrow{c_1 e_1'}| - \frac{1}{4} l_i \right) \cdot \text{sgn}(\vec{v}_i \cdot \overrightarrow{c_1 e_1'}) \quad (6)$$

$$e_i' = c' + R\vec{v}_1 \cdot \text{sgn}(\vec{v}_i \cdot \overrightarrow{c_1 e_1'}) \quad (7)$$

And the length of the cylinder is modified to:

$$l_i' = |\overrightarrow{c_1 e_1'}| + \frac{1}{2} l_i \quad (8)$$

Accordingly, as illustrated in FIGS. 11A and 11B, the cylinder $c_1$ is extended and elbow $e_1$ is added to connect cylinder $c_1$ with cylinder $c_2$.

Experimental Results

Figure 12:
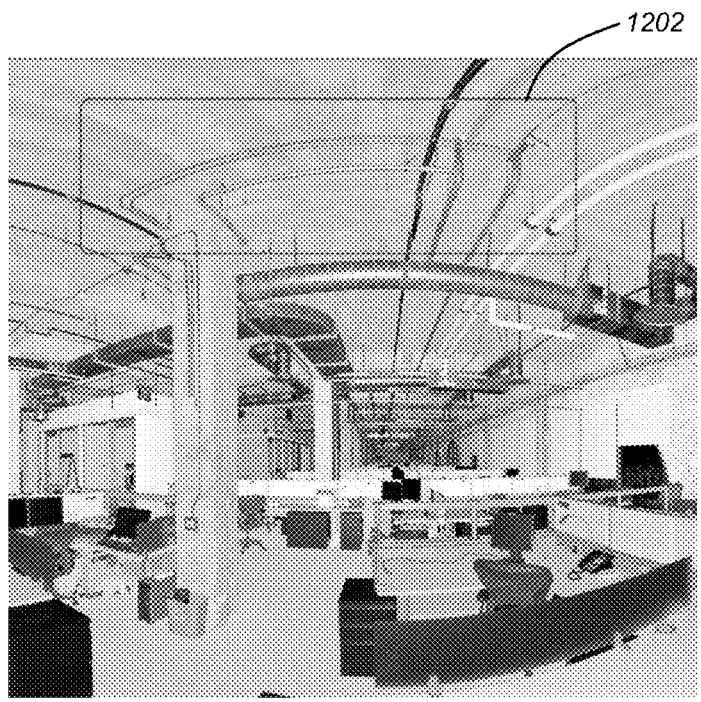
FIG. 12 illustrates a part of point cloud data that selected from the scan of an office shown in accordance with one or more embodiments of the invention.

The experimental data can be used such as the part of point cloud data selected from the scan of an office shown in FIG. 12. In FIG. 12, the user has selected a portion of the point cloud 1202 to model the pipelines. The pipelines contained in the selected data 1202 are very typical in an industrial environment.

Figure 13:
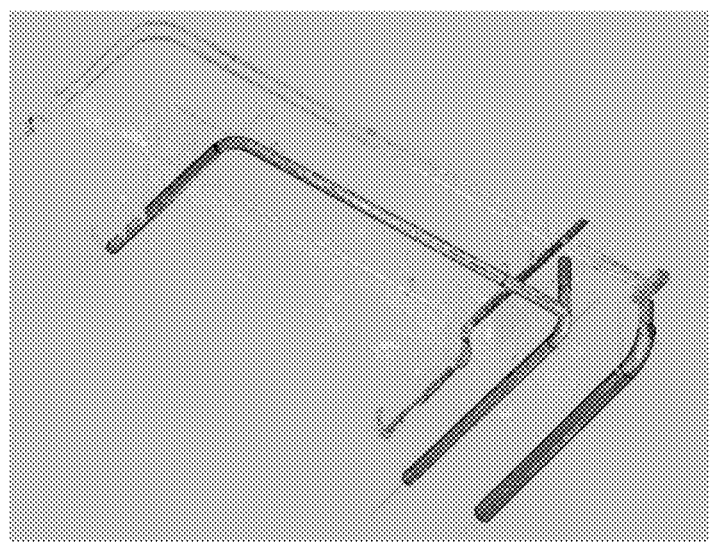
FIG. 13 illustrates pipelines extracted from real laser scanning data in accordance with one or more embodiments of the invention.

The result of modeling the point cloud data of FIG. 12 based on the system described herein is illustrated in FIG. 13. Accordingly, FIG. 13 illustrates pipelines extracted from real laser scanning data in accordance with one or more embodiments of the invention. Some pipelines with tiny radii are not modeled because of the deficiency of the points. Although the "pipes" shown in FIG. 13 are not real pipe components, the primary information of the pipe components (including the center line and the outer radius) have been extracted. Thereafter, real pipelines can be easily modeled. From the result, one can see that the extracted pipelines comply well with the laser scanning data. The whole process is almost automatic except some selection operation executed by the users, which makes the performance of the pipeline extraction process efficient, especially compared to the time used to obtain the same information with traditional manual approaches.

Overall Logical Flow

Figure 14:
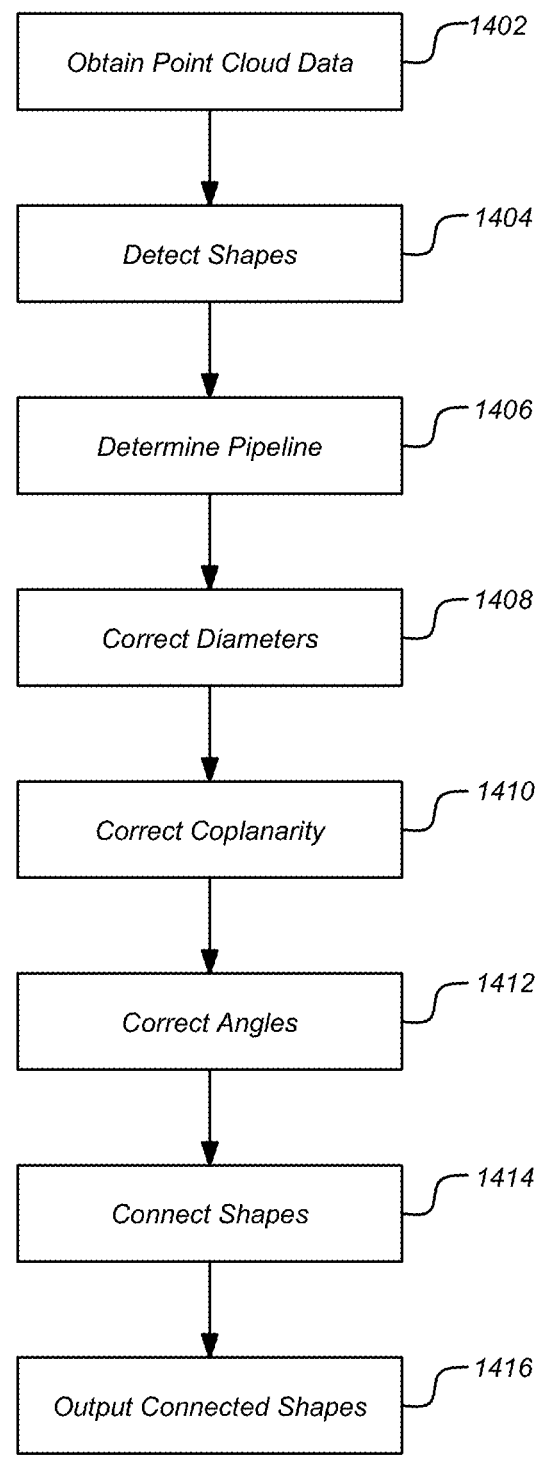
FIG. 14 illustrates the overall logical flow for reconstructing a pipe from point cloud data in accordance with one or more embodiments of the invention.

In view of the above description, an overall logical flow for reconstructing a pipe from point cloud data (e.g., on a computer in a computer aided design system [CAD]) is illustrated in FIG. 14.

At step 1402, point cloud data is obtained.

At step 1404, one or more primitive geometric shapes are detected in the point cloud data. To detect the shapes, a seed point is selected from the point cloud data. A set of points in the neighborhood of the seed point are found. For each shape being considered, the set of points is fit to a shape using a faithful distance minimization approach, the number of points that are compatible to the shape are determined, and the shape is added to a candidate shape set if a ratio based on the number of points exceeds a threshold value. Thereafter, the shapes in the candidate shape set are sorted by distance cost and the shape with the minimum distance cost is selected. The detection process then iteratively searches for and adds additional points, from the point cloud data, to the set of points, for those additional points that satisfy a condition determining if the points under consideration lie on a surface of the selected shape. If the selected shape is invalid for the set of points that includes the additional points, the process returns to the sorting process above. However, if the selected shape is valid for the set of points that includes the additional points, the selected shape is added to a final shape set.

At step 1406, a pipeline is determined by determining predecessor and successor primitive geometric shapes for each of the one or more primitive geometric shapes.

At step 1408, one or more diameters of the one or more primitive geometric shapes in the pipeline are corrected. The diameter correction process groups one or more of the primitive geometric shapes having a similar (e.g., less than 5% internal deviation among the diameters) diameter into a group. Thereafter, the diameter of each of the one or more primitive geometric shapes in the group is corrected/adjusted to a common diameter. The common diameter may be computed as a closest standard diameter to an average diameter for the shapes in the group. Alternatively, the common diameter may comprise an average diameter for the primitive geometric shapes in the group.

At step 1410, a coplanarity of the one or more primitive geometric shapes is corrected. The coplanarity is corrected by grouping the shapes that belong to the same plane into a group, and correcting a position of the shapes in the group to be coplanar. To group the shapes, each shape is examined to determine if it has been assigned to a plane. If the shape has not been assigned to a plane, a first plane is created and the shape is added as a first member of the first plane. Thereafter, a second primitive geometric shape (from the members of the previous planes) that is linked to the first shape is found, and added as a second member of the first plane. Lastly, other (e.g., third) shapes that lie on the first plane and have not been assigned to any other plane are found and added as (third) members of the first plane.

To correct the position of the shapes in the group to be coplanar, an optimal average plane from axis of the shapes in the group is determined, and all of the axis are adjusted by projecting the axis to the optimal average plane.

At step 1412, one or more angles between the one or more primitive geometric shapes are corrected. To correct the angles, a first angle between two of the shapes is computed and compared to a standard angle from a component library. One or both of the shapes are then adjusted to result in the first angle matching the standard angle.

At step 1414, the one or more primitive geometric shapes are connected. To connect the shapes, the shapes may either be extended to meet another part or a new part may be modeled (e.g., an elbow).

At step 1416, the connected primitive geometric shapes (i.e., the reconstructed pipeline) are output. Such an output may be by displaying the pipe on a display device, by storing data representative of the pipe on a computer readable storage medium, by transmitting the representative data to another device (e.g., computer), by printing the data, or my any other means capable of transforming the point cloud data into an electronic form that represents such point cloud data in a manipulatable form.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the pipe extraction from point cloud data problem is solved by primitive-based modeling. An automatic primitive shape detection procedure is used to detect the interested primitive components (e.g., cylinders, tori) from the laser scanning points. The primitive shapes are optimized and corrected for connection. Moreover, non-detected parts are deduced and modeled based on the information of detected primitives or by comparing them to standard components in the library. The pipe extraction procedure of embodiments of the invention alleviates human labor intervention and improves the quality of the pipe runs modeled from unorganized point cloud data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

ARYA S., MOUNT D. M., NETANYAHU N. S., SILVERMAN R., 1998, An optimal algorithm for approximate nearest neighbor searching in fixed dimensions; Journal of ACM, Volume 45(6), 891-923.

BAUER, U. AND POLTHIER, K. 2007. Parametric Reconstruction of Bent Tube Surfaces. In Proceedings of the 2007 international Conference on Cyberworlds (Oct. 24-26, 2007). International Conference on Cyberworlds. IEEE Computer Society, Washington, D.C., 465-474.

BOSCHE F., 2003, Model Spell Checker' for Primitive-based As-built Modeling in Construction, Master of Science Thesis, Supervisor: Dr. Katherine A. Liapi and Dr Carl T. Haas, Department of Civil, Architectural and Environmental Engineering, University of Texas at Austin (USA).

BOSCHE F., HAAS C. T., 2008, Automated Retrieval of 3D CAD Model Objects in Construction Range Images, Journal of Automation in Construction, Volume 17, Issue 4, pp. 499-512.

GALLUP, D., THOMAS C. HENDERSON, 2004, Reverse Engineering of Pipe Layoutsand 3D Point Set Damage Models, technical report of Utah university.

ERMES, P., HEUVEL, F. A. V. D. AND VOSSELMAN, G., 1999. A photogrammetric measurement method using CSG models. In: IAPRS, Vol. 32, part 5/W11, pp. 36-42.

FU, Y., YANG, S., ZHU, X. F., YUAN, R., 2010, Primitive Shape Extraction from Unorganized Point Cloud Data, Technical Report, Autodesk.

LUTTON, E., MAITRE, H. and LOPEZ-KRAHE, J., 1994, Contribution to the determination of vanishing points using Hough transform. IEEE Trans. Pattern. Anal. Mach. Intell. 16(4), 430-438.

LUK ÂCS, G., MARSHALL, A. D. and MARTIN, R. R., 1998, Faithful Least-Squares Fitting of Spheres, Cylinders, Cones, and Tori for Reliable Segmentation, Proc. Fifth European Conf. Computer Vision (ECCV '98), vol. I, 671-686.

MARSHALL, D., LUKACS, G. AND MARTIN, R. 2001, Robust segmentation of primitives from range data in the presence of geometric degeneracy, IEEE Transaction on Pattern Analysis and Machine Intelligence, 23(3), 304-314.

NOURSE, B. E., HAKALA, D. G., HILLYARD, R. C., and MALRAISON, P. J., 1980. Natural quadrics in mechanical design. In: Proceedings of Autofact West 1, Anaheim, Calif., 363-378.

PETITJEAN, S., 2002. A survey of methods for recovering quadrics in triangle meshes. ACM Computing Surveys, 34(2), pp. 211-262.

RODRIGO DE TOLEDO AND BRUNO LÉVY AND JEAN-CLAUDE PAUL, 2008, Reverse Engineering for Industrial-Plant CAD Models, TMCE, Tools and Methods for Competitive Engineering RUWEN SCHNABEL., ROLAND WAHL., REIHARD KLEIN., Shape Detection in Point Clouds, Computer Graphics Forum (2007), Volume: 26, Issue: 2, Pages: 214-226

SÖREN, K., 2009, Consistent Propagation of Normal Orientation in Point Clouds, In Proceedings of VMV 2009, TAHIR, R. S., 2005, Automatic Reconstruction of Industrial Installations Using Point Clouds and Images, Ph.D Dissertations of TU Delft, ISBN-10: 90 6132 297 9

TAUBIN, G., 1991, Estimation Of Planar Curves, Surfaces And Non-planar Space Curves Defined By Implicit Equations, With Applications To Edge And Range Image Segmentation", IEEE Trans. PAMI, Vol. 13, 1115-1138.

TRUCCO, E. and FISHER, R. B., 1995. Experiments in curvature-based segmentation of range data. PAMI 17(2), pp. 177-182.

What is claimed is:

1. A computer implemented method for reconstructing a pipe from point cloud data, comprising:
   (a) obtaining, in a computer, point cloud data;
   (b) detecting, in the computer, two or more primitive geometric shapes in the point cloud data, wherein:
      (1) the detecting comprises determining if a content database is available;
      (2) when a content database is available, content-based pipe extraction is performed such that the two or more primitive geometric shapes are detected and compared with content in the content database; and
      (3) when a content database is not available, automatic quadric surface segmentation is used to detect the two or more primitive geometric shapes;
   (c) determining, in the computer, a pipeline by determining predecessor and successor primitive geometric shapes for each of the two or more primitive geometric shapes;
   (d) correcting, in the computer, one or more diameters of the two or more primitive geometric shapes in the pipeline;
   (e) correcting, in the computer, a coplanarity of the two or more primitive geometric shapes;
   (f) correcting, in the computer, one or more angles between the two or more primitive geometric shapes;
   (g) connecting, in the computer, the two or more primitive geometric shapes, wherein the connecting comprises:
      (1) examining the coplanarity of two primitive geometric shapes;
      (2) examining center lines of the two primitive geometric shapes; and
      (3) connecting the two primitive geometric shapes when the two primitive geometric shapes are on a same plane and the center lines are on a same line; and
   (h) outputting, in the computer, the connected primitive geometric shapes.

2. The computer implemented method of claim 1, wherein the detecting comprises:
   (a) selecting a seed point from the point cloud data;
   (b) finding a set of points in a neighborhood of the seed point;
   (c) for each shape being considered:
      (i) fitting the shape to the set of points using a faithful distance minimization approach;
      (ii) determining a number of points, in the set of points, that are compatible to the shape; and
      (iii) adding the shape to a candidate shape set if a ratio based on the number of points exceeds a threshold value;
   (d) sorting the shapes in the candidate shape set by distance cost;
   (e) selecting the shape in the candidate shape list with the minimum distance cost;
   (f) iteratively searching for and adding additional points, from the point cloud data, to the set of points, wherein the additional points satisfy a condition determining if the set of points lie on a surface of the selected shape;
   (g) if the selected shape is invalid for the set of points that includes the additional points, returning to step (d); and
   (h) if the selected shape is valid for the set of points that includes the additional points, adding the selected shape to a final shape set.

3. The computer implemented method of claim 1, wherein the correcting one or more diameters comprises:
   grouping two or more of the primitive geometric shapes having a similar diameter into a group; and
   correcting the diameter of each of the two or more primitive geometric shapes in the group to a common diameter.

4. The computer implemented method of claim 3, wherein the primitive geometric shapes have a similar diameter if there is less than 5% internal deviation among the diameters.

5. The computer implemented method of claim 3, wherein the common diameter comprises a closest standard diameter to an average diameter for the primitive geometric shapes in the group.

6. The computer implemented method of claim 3, wherein the common diameter comprises an average diameter for the primitive geometric shapes in the group.

7. The computer implemented method of claim 1, wherein the correcting the coplanarity of the two or more primitive geometric shapes comprises:
   grouping two or more of the primitive geometric shapes that belong to a same plane into a group; and
   correcting a position, of the two or more primitive geometric shapes in the group, to be coplanar.

8. The computer implemented method of claim 7, wherein the grouping step comprises performing the following steps for each of the primitive geometric shapes:
   determining if a first primitive geometric shape has been assigned to a plane;
   if the first primitive geometric shape has not been assigned to a plane, creating a first plane and adding this first primitive geometric shape as a first member of the first plane;
   finding, in members of previous planes, a second primitive geometric shape that is linked to the first primitive geometric shape, and adding the second primitive geometric shape as a second member of the first plane; and
   finding a third primitive geometric shape that lies on the first plane and has not been assigned to any other plane, and adding the third primitive geometric shape as a third member of the first plane.

9. The computer implemented method of claim 7, wherein the correcting a position, of the two or more primitive geometric shapes in the group, to be coplanar comprises:
   determine an optimal average plane from axis of the two or more primitive geometric shapes in the group; and
   adjusting the axis of the two or more primitive geometric shapes in the group by projecting the axis to the optimal average plane.

10. The computer implemented method of claim 1, wherein the correcting one or more angles between the two or more primitive geometric shapes comprises:
    computing a first angle between two of the two or more primitive geometric shapes;
    comparing the first angle to a standard angle from a component library; and
    adjusting the one or both of the two primitive geometric shapes to result in the first angle matching the standard angle.

11. The computer implemented method of claim 1, wherein the connecting the two or more primitive geometric shapes comprises:
    extending a first primitive geometric shape to connect to a second primitive geometric shape.

12. The computer implemented method of claim 1, wherein the connecting the two or more primitive geometric shapes comprises:
    modeling an elbow to connect a first primitive geometric shape to a second primitive geometric shape.

13. A computer modeling system for reconstructing a pipe from point cloud data, in a computer system comprising:
    (a) a computer having a memory; and
    (b) an application executing on the computer, wherein the application is configured to:
       (i) obtain point cloud data;

(ii) detect two or more primitive geometric shapes in the point cloud data, wherein:
(1) the detecting comprises determining if a content database is available;
(2) when a content database is available, content-based pipe extraction is performed such that the two or more primitive geometric shapes are detected and compared with content in the content database; and
(3) when a content database is not available, automatic quadric surface segmentation is used to detect the two or more primitive geometric shapes;
(iii) determine a pipeline by determining predecessor and successor primitive geometric shapes for each of the two or more primitive geometric shapes;
(iv) correct one or more diameters of the two or more primitive geometric shapes in the pipeline;
(v) correct a coplanarity of the two or more primitive geometric shapes;
(vi) correct one or more angles between the two or more primitive geometric shapes;
(vii) connect the two or more primitive geometric shapes wherein the application is configured to connect by:
(1) examining the coplanarity of two primitive geometric shapes;
(2) examining center lines of the two primitive geometric shapes; and
(3) connecting the two primitive geometric shapes when the two primitive geometric shapes are on a same plane and the center lines are on a same line; and
(viii) output the connected primitive geometric shapes.

14. The computer implemented system of claim 13, wherein the application is configured to detect by:
(a) selecting a seed point from the point cloud data;
(b) finding a set of points in a neighborhood of the seed point;
(c) for each shape being considered:
(i) fitting the shape to the set of points using a faithful distance minimization approach;
(ii) determining a number of points, in the set of points, that are compatible to the shape; and
(iii) adding the shape to a candidate shape set if a ratio based on the number of points exceeds a threshold value;
(d) sorting the shapes in the candidate shape set by distance cost;
(e) selecting the shape in the candidate shape list with the minimum distance cost;
(f) iteratively searching for and adding additional points, from the point cloud data, to the set of points, wherein the additional points satisfy a condition determining if the set of points lie on a surface of the selected shape;
(g) if the selected shape is invalid for the set of points that includes the additional points, returning to step (d); and
(h) if the selected shape is valid for the set of points that includes the additional points, adding the selected shape to a final shape set.

15. The computer implemented system of claim 13, wherein the application is configured to correct the one or more diameters by:
grouping two or more of the primitive geometric shapes having a similar diameter into a group; and
correcting the diameter of each of the two or more primitive geometric shapes in the group to a common diameter.

16. The computer implemented system of claim 15, wherein the primitive geometric shapes have a similar diameter if there is less than 5% internal deviation among the diameters.

17. The computer implemented system of claim 15, wherein the common diameter comprises a closest standard diameter to an average diameter for the primitive geometric shapes in the group.

18. The computer implemented system of claim 15, wherein the common diameter comprises an average diameter for the primitive geometric shapes in the group.

19. The computer implemented system of claim 13, wherein the application is configured to correct the coplanarity of the two or more primitive geometric shapes by:
grouping two or more of the primitive geometric shapes that belong to a same plane into a group; and
correcting a position, of the two or more primitive geometric shapes in the group, to be coplanar.

20. The computer implemented system of claim 19, wherein the application is configured to group by performing the following steps for each of the primitive geometric shapes:
determining if a first primitive geometric shape has been assigned to a plane;
if the first primitive geometric shape has not been assigned to a plane, creating a first plane and adding this first primitive geometric shape as a first member of the first plane;
finding, in members of previous planes, a second primitive geometric shape that is linked to the first primitive geometric shape, and adding the second primitive geometric shape as a second member of the first plane; and
finding a third primitive geometric shape that lies on the first plane and has not been assigned to any other plane, and adding the third primitive geometric shape as a third member of the first plane.

21. The computer implemented system of claim 19, wherein the application is configured to correct a position, of the two or more primitive geometric shapes in the group, to be coplanar by:
determining an optimal average plane from axis of the two or more primitive geometric shapes in the group; and
adjusting the axis of the two or more primitive geometric shapes in the group by projecting the axis to the optimal average plane.

22. The computer implemented system of claim 13, wherein the application is configured to correct one or more angles between the two or more primitive geometric shapes by:
computing a first angle between two of the two or more primitive geometric shapes;
comparing the first angle to a standard angle from a component library; and
adjusting the one or both of the two primitive geometric shapes to result in the first angle matching the standard angle.

23. The computer implemented system of claim 13, wherein the application is configured to connect the two or more primitive geometric shapes by:
extending a first primitive geometric shape to connect to a second primitive geometric shape.

24. The computer implemented system of claim 13, wherein the application is configured to connect the two or more primitive geometric shapes by:
modeling an elbow to connect a first primitive geometric shape to a second primitive geometric shape.

* * * * *

UNITED STATES PATENT AND TRADEMARK OFFICE
CERTIFICATE OF CORRECTION

| | | |
|---|---|---|
| PATENT NO. | : 8,605,093 B2 | Page 1 of 1 |
| APPLICATION NO. | : 12/849647 | |
| DATED | : December 10, 2013 | |
| INVENTOR(S) | : Yan Fu et al. | |

It is certified that error appears in the above-identified patent and that said Letters Patent is hereby corrected as shown below:

In the claims

Column 19

Lines 3-4, delete the text, "(1) the detecting comprises determining if a content database is available;" and insert the text, --(1) the detect step is configured to determine if a content database is available;--

Signed and Sealed this
Thirteenth Day of September, 2016

Michelle K. Lee
*Director of the United States Patent and Trademark Office*